(12) United States Patent
Joseph et al.

(10) Patent No.: US 6,194,687 B1
(45) Date of Patent: Feb. 27, 2001

(54) CHILD CAR SEAT HEATING SURFACE

(76) Inventors: Matthew Joseph, 16403 State Rte. 45, Wellsville, OH (US) 43968; Christopher Joseph, 50632 Duke Rd.; Michael B. Joseph, 13712 Old Fredericktown Rd., both of East Liverpool, OH (US) 43920

( * ) Notice: Subject to any disclaimer, the term of this patent is extended or adjusted under 35 U.S.C. 154(b) by 0 days.

(21) Appl. No.: 09/366,423

(22) Filed: Aug. 2, 1999

(51) Int. Cl.[7] .................................................. H05B 1/00
(52) U.S. Cl. ........................ 219/217; 219/212; 219/529; 219/549
(58) Field of Search .................... 219/202, 211, 219/212, 217, 527, 528, 529, 543, 544, 545, 549, 552; 297/219.2, 225, 229, 228.1, 228.13

(56) References Cited

U.S. PATENT DOCUMENTS

| | | | |
|---|---|---|---|
| 3,281,578 | * 10/1966 | Chapman, Jr. .......................... | 219/528 |
| 3,558,858 | * 1/1971 | Luger, Jr. .............................. | 219/528 |
| 4,628,188 | * 12/1986 | Andreasson .......................... | 219/528 |
| 4,695,091 | * 9/1987 | Altmann et al. ...................... | 219/528 |
| 4,736,088 | * 4/1988 | Bart ...................................... | 219/211 |
| 4,813,738 | * 3/1989 | Ito ........................................ | 219/217 |
| 4,952,776 | * 8/1990 | Huguet ................................. | 219/217 |
| 4,964,674 | * 10/1990 | Altmann et al. ...................... | 219/217 |
| 5,151,578 | * 9/1992 | Phillips ................................ | 219/549 |
| 5,302,806 | * 4/1994 | Simmons et al. .................... | 219/211 |
| 5,422,462 | * 6/1995 | Kishimoto ............................ | 219/545 |
| 5,516,189 | * 5/1996 | Ligeras ................................. | 219/217 |
| 5,545,194 | * 8/1996 | Augustine ............................ | 219/212 |
| 5,662,380 | * 9/1997 | Tam et al. ........................ | 297/219.12 |
| 5,723,845 | * 3/1998 | Partington et al. .................. | 219/217 |

\* cited by examiner

Primary Examiner—Joseph Pelham
Assistant Examiner—Fadi H. Dahbour
(74) Attorney, Agent, or Firm—Harpman & Harpman

(57) ABSTRACT

A form fitting heating surface for children's safety car seats having a contoured deformable apertured shape that is adaptable within a car seat on which the child is positioned. The heating surface is electrically connected to the automobile's power supply and is thermostatically controlled. Attachment elements adjustably extend from the heating surface for engagement over a portion of the car seat holding the heating surface insert in place within.

7 Claims, 2 Drawing Sheets

US 6,194,687 B1

CHILD CAR SEAT HEATING SURFACE

BACKGROUND OF THE INVENTION

1. Technical Field

This device relates to electrical devices for applying heat to the body of a person by electric resistant wires and more specifically heating pads made of flexible fabric material with a plurality of loop heating wires defining a circuit within.

2. Description of Prior Art

Prior art devices of this type are generally referred to as electric blankets and heating pads. The electric blankets are generally used on beds to add additional heat to the sleeping environment. Heating pads are typically smaller and provide heat to specific portions of the user's body. These devices have electrical resistant heating wires positioned within. See for example U.S. Pat. Nos. 2,281,578, 4,736,088 and 5,151,578.

In U.S. Pat. No. 3,281,578 an electric heating mat is disclosed having a main body member with a plurality of heating elements within.

U.S. Pat. No. 4,736,088 is directed to a therapeutic heating pad and hand muff having a laminated structure which directs the flow of heat into the effective body member.

U.S. Pat. No. 5,151,578 discloses an anisotropically bendable heating pad having stiffening member channels that provide indirect stiffness thereto.

SUMMARY OF THE INVENTION

An electrical heating surface for a child's car seat having a contoured fabric body member with an enclosed electrical resistant wire loop. Apertures are provided within the surface to correspond to the access openings for the seat belt harness in the seat that secures a child and holds the child within. Attachment elements extend from the heating surface to secure same within the car seat. An electrical connection is provided to the automobile power supply which is thermostatically controlled to regulate heat output. Portions of the heating surface are contoured and adaptable to engage and hold within the car seat allowing access to the child safety harness.

DESCRIPTION OF THE PREFERRED EMBODIMENT

Figure 1:
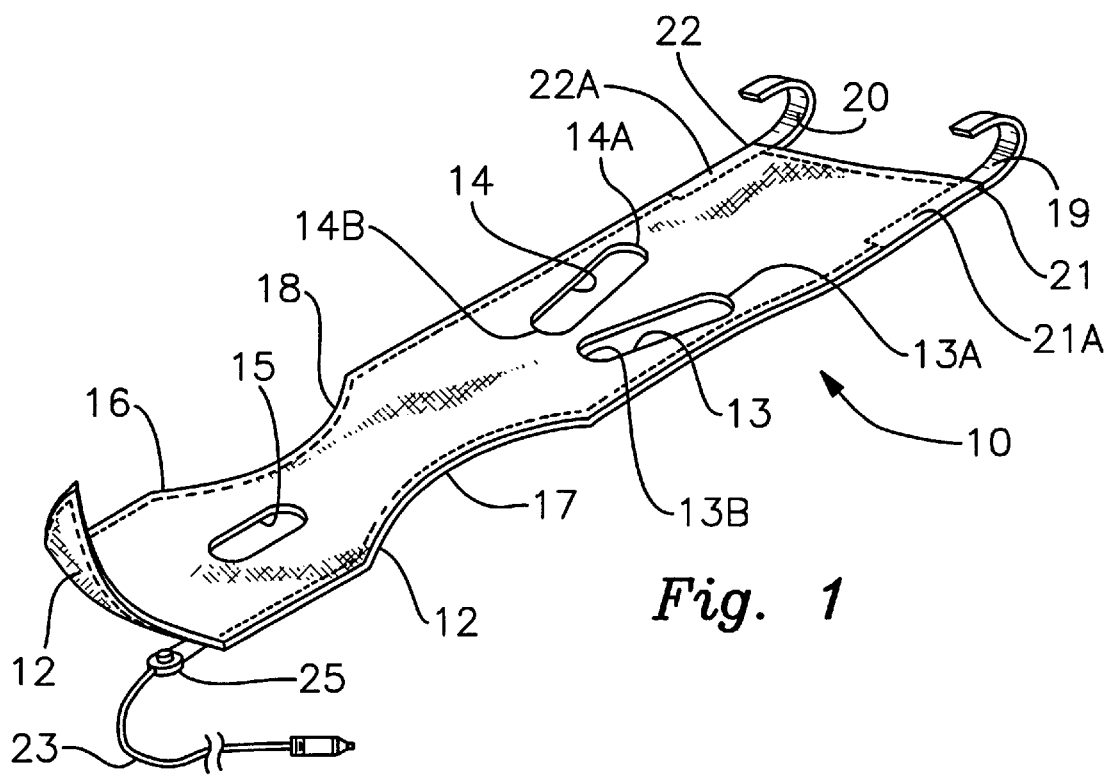
FIG. 1 is a perspective view of the heating surface for a children's car safety seat.
Figure 2:
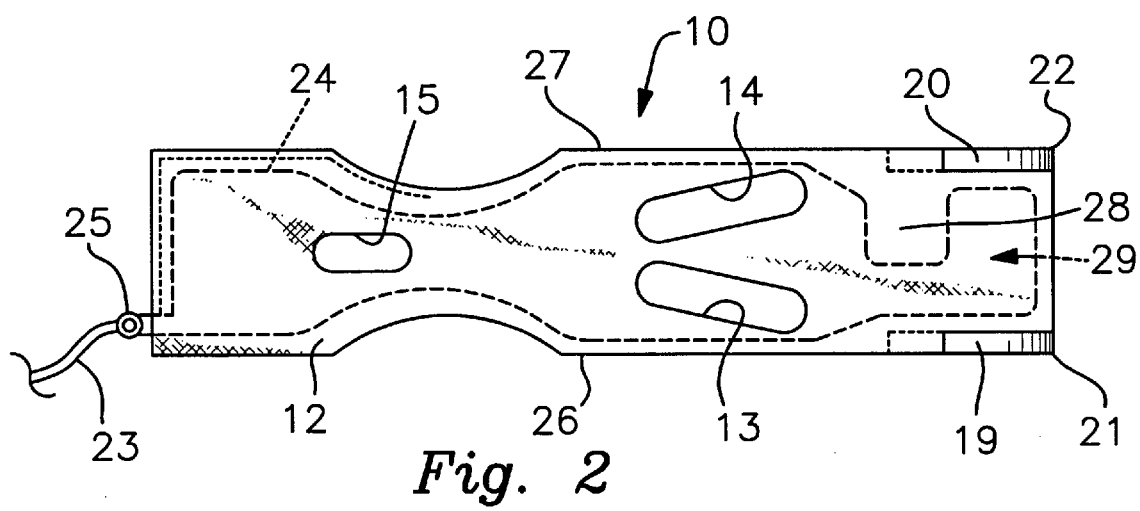
FIG. 2 is a top plan view of the heating surface as seen in FIG. 1.
Figure 3:
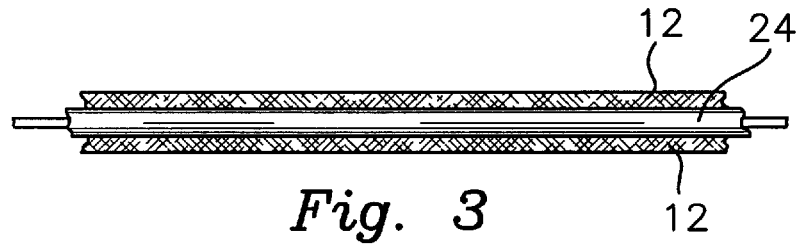
FIG. 3 is an enlarged partial cross-sectional view of the heating surface electrical resistant elements within the fabric containment member.

A heating surface 10 for a child's car seat 11 can be seen in FIGS. 1–4 of the drawings preferably formed from a pair of flexible fabric sheets 12 joined together to form a generally rectangular body member as best seen in FIGS. 1 and 2 of the drawings. The fabric sheets 12 each have a plurality of openings at 13, 14, and 15 which are correspondingly aligned between each sheet to form access apertures in the configured body member that will be described in greater detail later.

The sheets 12 are secured together by traditional fabrication techniques such as by stitching 16 about the perimeter edge and around the defined openings 13, 14 and 15 as is typical in fabric blanket construction, well known and understood by those skilled in the art.

Portions of the formed heating surface 10 are contoured at 17 and 18 respectively to define an area of decreased transverse dimension which is adjacent the hereinbefore described opening 15, as best seen in FIG. 2 of the drawings. The opening pair of 13 and 14 are of a generally rectangular shape having oppositely disposed curved ends 13A and 13B, 14A and 14B respectively and are angularly aligned to one another as best seen in FIG. 2 of the drawings.

A pair of engagement hooks 19 and 20 extend from respective end corner portions 21 and 22 of the formed heating surface 10 opposite the opening pair 13 and 14 as hereinbefore described. Each of the engagement hooks 19 and 20 extend from pockets 21A and 22A in the heating surface 10 as hereinbefore described and best seen in FIGS. 1 and 2 of the drawings.

An electric power cord 23 extends from the end of the heating surface 10 and is electrically connected to a loop of electrically resistant heating wire 24 shown in dotted lines in FIG. 2 of the drawings with a thermostatic switch 25 interconnected thereto. The heating wire 24 extends longitudinally within the heating surface 10 generally parallel to its perimeter edges 26 and 27 and then inwardly at 28 to define a secondary loop-like configuration at 29 in spaced parallel relation to the hereinbefore described apertures 13 and 14 and between the engagement hook pockets 21A and 22A.

Figure 4:
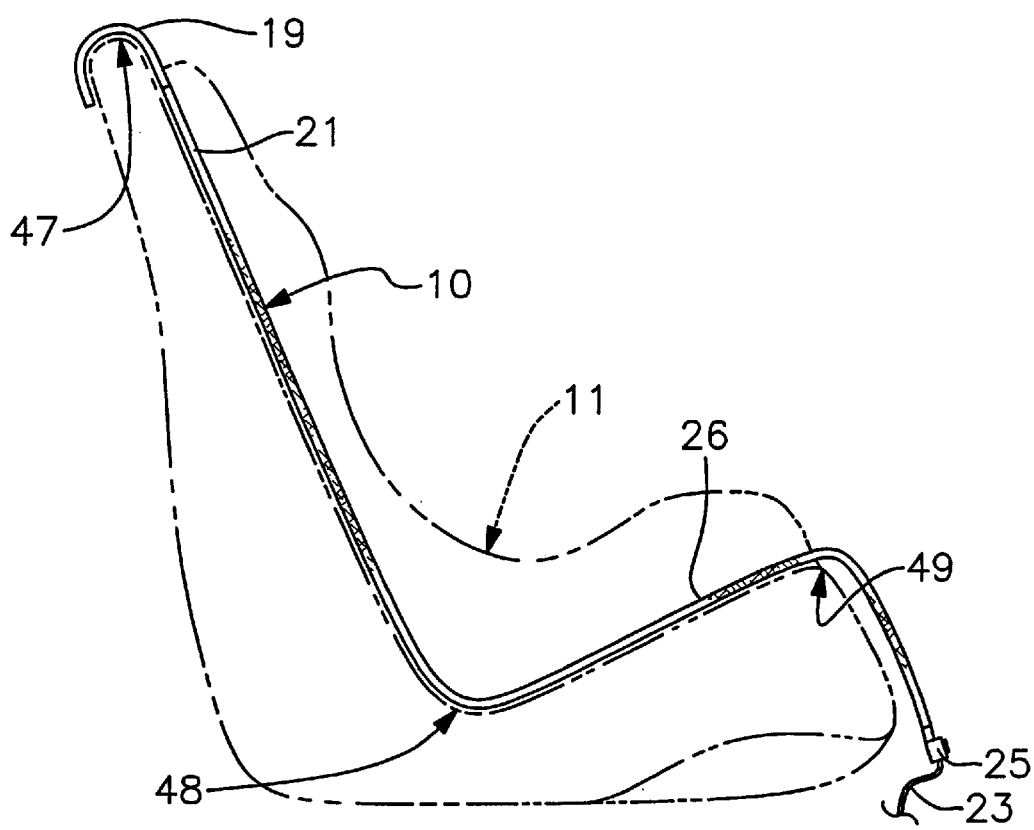
FIG. 4 is a side elevational view of a child safety car seat representation in broken lines with the heating surface of the invention positioned within.

In use, the area of the secondary loop 29 is where the head and upper back portion of a child (not shown) would be positioned in the car seat 11, as best seen in FIG. 4 of the drawings.

It will be apparent to those skilled in the art that in use the heating surface 10 of the invention is universal in that the respective openings at 13, 14, and 15 will accommodate a variety of available car seats that have different strap configurations to hold the child in place.

Figure 5:
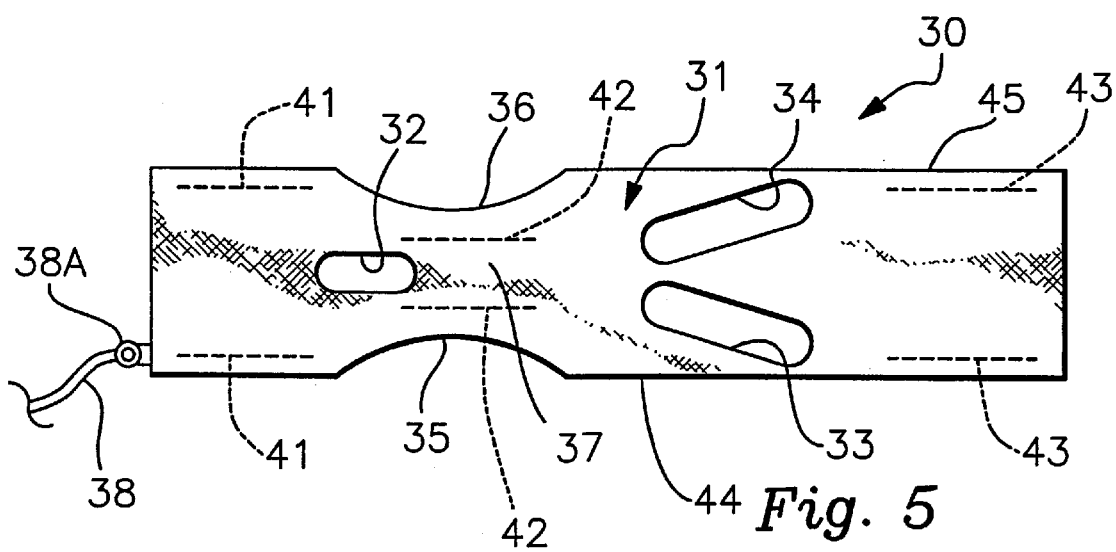
FIG. 5 is a top plan view of an alternate form of the invention having a plurality of spaced paired deformable stiffening elements within as illustrated in dotted lines.

Referring now to FIG. 5 of the drawings, an alternate form of the invention can be seen wherein a deformable heating surface 30 is shown having a generally flexible rectangular body member 31. Multiple belt access openings 32, 33 and 34 are formed within the body member 31. The access openings 32 and 33 are angularly disposed to one another and in spaced relation to the remaining access opening 34 as set forth in the primary form of the invention illustrated in FIGS. 1–4 of the drawings.

Portions of the deformable heating surface 30 at 35 and 36 define an area of decreased transverse dimension at 37. An electric power cord 38 with a thermostat 38A extends from one end of the deformable heating surface 30 and is interconnected to an electric resistant heating wire loop 39 within the body member 31 as indicated by broken lines.

Pairs of deformable support wires 41, 42 and 43 are positioned within the body member 31 shown in dotted lines. The first support wire pair 41 are in spaced parallel relation to one another inwardly of the respective perimeter edges 44 and 45. Second support wire pair 42 are in spaced parallel relationship within the area of reduced transverse dimension at 37. The third support wire pair 43 are also in spaced parallel relationship to one another inwardly of the respective perimeter edges 44 and 45 in oppositely disposed relation to said first wire pair 41.

In this alternate form of the invention, the deformable heating surface 30 for the child's car safety seat can be positioned and conformed to hold within the seat by manually bending the respective support wire pairs 41, 42 and 43 which are positioned in critical angled transition points identified at 47, 48 and 49 respectively as best seen in FIG. 4 of the drawings.

It will be evident from the above description that the deformable heating surface 30 is of an increased longitudinal dimension compared to that of the primary form of the invention set forth in FIGS. 1–4 of the drawings so that the support wire pair 41 will bend over the top back 50 of the child safety seat 11 as illustrated.

It will thus be seen that a new and novel heating surface for children's safety car seats has been illustrated and described and it will be apparent to those skilled in the art that various changes and modifications may be made therein without departing from the spirit of the invention.

Therefore I claim:

1. A universal heating surface insert for children's car seats comprising an elongated rectangular flat body member, having oppositely disposed contoured perimeter edge portions defining an area of decreased transverse dimension therebetween, an electrical resistant heating means arranged for heating substantial uniform surfaces of said body member, electrical connection means for connecting a source of electric power to said heating means, said heating means having a waterproof integral covering thereabout, plurality of access openings in said heating surface body member, a pair of retractable engagement hooks extending from one end of said heating surface body member within said car seat.

2. The universal heating surface set forth in claim 1 wherein some of said access openings are in angularly disposed oppositely disposed spaced relation to one another.

3. The universal heating surface set forth in claim 1 wherein said access openings are of a rectangularly defined shape within said body member.

4. The universal heating surface set forth in claim 1 wherein said heating means comprises electric resistant wires within said body member.

5. The universal heating surface set forth in claim 6 wherein said electrical resistant wires are arranged in elongated primary and secondary interconnected loop configurations.

6. The universal heating surface set forth in claim 1 wherein said elongated flat body member has oppositely disposed contoured perimeter edge portions defining a area of decreased transverse dimension therebetween.

7. The universal heating surface set forth in claim 1 wherein said electrical connecting means has a thermostat in communication therewith.

* * * * *